17# United States Patent Office 3,325,246
Patented June 13, 1967

3,325,246
PROCESS FOR PROVIDING SODIUM
TRIPHOSPHATE HEXAHYDRATE
Duane L. Sawhill, Orange, Conn., assignor to Olin Mathieson Chemical Corporation, New Haven, Conn., a corporation of Virginia
No Drawing. Filed Nov. 20, 1963, Ser. No. 325,167
6 Claims. (Cl. 23—107)

ABSTRACT OF THE DISCLOSURE

A process for providing a free-flowing, low density sodium triphosphate hexahydrate which can be dispersed in water without caking has been provided. The process involves contacting an aqueous solution of sodium triphosphate with ammonia to precipitate the desired hexahydrate.

This invention relates to a new and improved process for the preparation of sodium triphosphate hexahydrate, a valuable water conditioner and softener.

The commercial preparation of sodium triphosphate, also known as sodium tripolyphosphate, proceeds in accordance with the following equation:

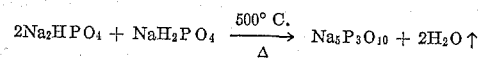

$$2Na_2HPO_4 + NaH_2PO_4 \xrightarrow[\Delta]{500°\,C.} Na_5P_3O_{10} + 2H_2O \uparrow$$

The reaction is performed in a calciner, and the technical anhydrous sodium triphosphate obtained is readily isolated as a solid product. This technical product is currently being manufactured on a very large scale, and its chief commercial application is as a builder in synthetic detergent formulations wherein it functions as a sequestering agent and also exerts a synergistic effect on the organic surfactant present in these formulations.

Anhydrous sodium triphosphate is also an effective water conditioner and softener, but for several reasons, it is preferred to utilize the corresponding hexahydrate ($Na_5P_3O_{10} \cdot 6H_2O$) in these applications. For example, the technical anhydrous material, although it is very soluble in water, must be added to water with efficient agitation since it is very dense and tends to lump and become caky when dispersed in an aqueous medium. This is an undesirable feature, and this caking problem has discouraged the use of the anhydrous product as a domestic water conditioner and softener. Similarly, the anhydrous material is a powerful desiccant, and this property has created considerable practical problems when attempts have been made to utilize it as an ingredient in various dry formulations. For instance, sodium perborate monohydrate is a constituent used in one type of common dry household bleach, and the anhydrous sodium triphosphate is in a sense incompatible with this material since it aborbs the water of hydration producing a caky mixture which is difficult to pour and handle. The use of sodium triphosphate hexahydrate as a water conditioner and softener is not accompanied by these deficiencies, and a market exists for this material as a domestic water softener and as a component of dry, mixed cleaners.

However, previous attempts to prepare the aforementioned hexahydrate in high yield and purity from the technical anhydrous product have been unsatisfactory and uneconomical. The hexahydrate cannot be crystallized from aqueous solution based on variations in solubility at different temperatures since its solubility in water is essentially constant over a wide temperature range. Furthermore, sodium triphosphate readily forms supersaturated aqueous solutions which complicates controlled crystal growth from such solutions. Conventional methods of crystallizing the hexahydrate from aqueous solution (i.e., vacuum crystallization, crystallization with ethanol or sodium hydroxide) yield an undesirable product. It consists of small, agglomerated, rectangular-plate crystals which are highly twinned and difficult to filter and dry. The dried crystals have poor flow characteristics.

Therefore, the principal object of this invention is to provide a convenient and economical process for the preparation of the aforementioned hexahydrate in high yield from technical anhydrous sodium triphosphate. Another object of this invention is to provide an efficient process for the preparation of low density sodium triphosphate hexahydrate. Still another object of this invention is to provide a process for preparing free-flowing sodium triphosphate hexahydrate which can be easily dispersed in an aqueous medium without caking.

These objects have been accomplished in accordance with this invention. A process is herein provided wherein sodium triphosphate hexahydrate is efficiently and economically prepared in high yield from technical anhydrous sodium triphosphate. The solid hexahydrate obtained as a result of this novel process is a coarse, white material characterized by low density. The product is a free-flowing solid, and no caking problem arises when it is dispersed in aqueous solution.

The process disclosed herein utilizes ammonia as a precipitating agent to obtain sodium triphosphate hexahydrate in high yield from an aqueous solution of the technical triphosphate. It has been found that when an aqueous solution of sodium triphosphate is contacted with ammonia, the crystalline hexahydrate precipitates from solution and can be readily isolated. The hexahydrate obtained as a result of this technique is isolated in the form of large granules, each an agglomerate of many small, plate-like crystals growing from a common nucleus. This granular product is conveniently separated from the ammoniacal mother solution by conventional means such as by filtration or centrifugation.

It is known that technical anhydrous sodium triphosphate, prepared as disclosed in the preceding equation, exists in either of two crystalline forms or mixtures thereof. These forms are known to those skilled in this art as Phase I and Phase II. A quick, convenient analytical procedure for determining the particular form of sodium triphosphate is based on a temperature rise test as disclosed in A.S.T.M. Bulletin of July 1953, page 45. It has been found that the hexahydrate can be readily prepared from either of these forms by the process of this invention. When sodium triphosphate of the form Phase II is utilized, however, a somewhat better yield of the hexahydrate can be obtained since the Phase II material does have an appreciably higher solubility in water.

Several procedures have been employed to obtain the desired crystalline hexahydrate. For example, aqueous ammonia solutions and aqueous sodium triphosphate solutions can be added simultaneously to a container whereby the hexahydrate precipitate is formed. Similarly, an aqueous triphosphate solution can be added to an ammoniacal solution with formation of high quality crystalline sodium triphosphate hexahydrate. However, it has been found that the preferred technique is to add ammonia to an aqueous solution of sodium triphosphate since the crystalline hexahydrate obtained as a result of this procedure is somewhat easier to dry than the products obtained as a result of the aforementioned modes of addition.

If desired, gaseous ammonia may be passed into an aqueous sodium triphosphate solution to obtain the crystalline hexahydrate. However, the heat of solution is fairly intense, and good cooling means must be employed when using this procedure. Therefore, the most convenient procedure involves the addition of an aqueous ammonia solution to an aqueous solution of the triphosphate.

The preferred temperature range at which the crystalline hexahydrate can be prepared in accordance with this invention is about 0°–45° C. and an even more preferable range is about 20°–30° C. The hexahydrate can be prepared at temperatures above 45° C. if so desired, but pressure equipment is required at such elevated temperatures because of the volatility of the ammonia at these temperatures.

Although the crystalline hexahydrate can be isolated by contacting or mixing ammonia with dilute aqueous solutions of sodium triphosphate, it is preferred to utilize concentrated aqueous solutions of the triphosphate in the disclosed process in order to obtain high yields of the hexahydrate. The highest yields have been obtained when aqueous solutions containing at least 12% of sodium triphosphate are contacted with ammonia. Sodium triphosphate readily forms supersaturated aqueous solutions, and these solutions are particularly useful in obtaining high yields of hexahydrate. It has been found, for example, that yields up to 98.5% of the hexahydrate have been obtained when an aqueous supersaturated solution (i.e., 28% by weight) of sodium triphosphate is mixed with ammonia.

The free-flowing, low density hexahydrate prepared by the process of this invention from beginning technical sodium triphosphate is remarkably free from impurities. The crystalline product contains only very small amounts of pyrophosphate, no high polymeric phosphates, and no nitrogenous materials. The hexahydrate readily forms clear aqueous solutions. Analysis of the hexahydrate thus prepared revealed that the moisture and $P_2O_5$ content are very close to the theoretical values of 22.7% and 44.75% respectively. The density of the product generally is in the range of about 0.25 to 0.45. Products having the higher values of density within this range tend to be formed when aqueous solutions containing high concentrations of sodium triphosphate are rapidly contacted with ammonia.

Another of the attractive features associated with this process is the ease and rapidity with which the bulk of the ammonia utilized can be recovered for re-use. Ammonia has a high vapor pressure over its aqueous solutions, and it has been found, for example, that in a mother liquor containing 15% ammonia by weight, 99% of the ammonia can be recovered by the distillation of only 25% of the water.

The following example will serve to illustrate the preparation of sodium triphosphate hexahydrate in accordance with this invention, but it is not to be construed as limiting the scope of the invention.

*Example 1*

Into a beaker containing 300 g. of water was slowly added 115 g. of anhydrous, technical, Phase II sodium triphosphate powder. The mixture was vigorously agitated during addition to prevent lumping. The resulting warm solution was filtered to remove trace amounts of insoluble matter. The filtrate was cooled to room temperature and placed in a three-necked stoppered reaction flask equipped with stirrer and dropping funnel. Then 300 mls. of a 28% by weight aqueous ammonia solution was added to the flask over a 45 minute period with stirring. The temperature during this period was constant at about 25° C. The resulting mixture was stirred at room temperature for an additional fifteen minutes, and then the precipitated crystalline hexahydrate was filtered from the ammoniacal mother liquor through a Büchner funnel. The damp crystals were dried at ambient temperature. The yield of sodium triphosphate hexahydrate thus obtained was 97.0% expressed on a $P_2O_5$ basis.

The product was a white, free-flowing crystalline material. It was light (density of about 0.4) and readily soluble in water due to the porosity of the granules. The crystalline hexahydrate granules were quite firm and resisted attrition. A screen analysis of the prepared hexahydrate gave the following data expressed as percent of product retained on screens of varying mesh size:

| | Percent |
|---|---|
| +40 mesh | 40.0 |
| +60 mesh | 81.4 |
| +100 mesh | 93.9 |

What is claimed is:
1. A process for providing sodium triphosphate hexahydrate which comprises providing an aqueous solution of sodium triphosphate, containing said aqueous solution with ammonia to precipitate sodium triphosphate hexahydrate from said aqueous solution, and isolating said hexahydrate from the aqueous reaction mixture.
2. The process of claim 1 wherein gaseous ammonia is added to said aqueous solution of sodium triphosphate.
3. The process of claim 1 wherein an aqueous ammonia solution is added to said aqueous solution of sodium triphosphate.
4. The process of claim 1 wherein said aqueous solution contains at least 12% by weight of sodium triphosphate.
5. A process for providing sodium triphosphate hexahydrate which comprises providing an aqueous solution of at least 12% by weight of sodium triphosphate, contacting said aqueous solution with ammonia at a temperature of about 0°–45° C. to precipitate sodium triphosphate hexahydrate from said aqueous solution, and isolating said hexahydrate from the aqueous reaction mixture.
6. The process of claim 5 wherein an aqueous supersaturated solution of sodium triphosphate is utilized.

References Cited

UNITED STATES PATENTS

| 1,856,187 | 5/1932 | Johnson | 23—107 |
| 3,046,092 | 7/1962 | Montague | 23—106 |

OSCAR R. VERTIZ, *Primary Examiner.*

O. F. CRUTCHFIELD, *Assistant Examiner.*